(12) United States Patent
Ahrens et al.

(10) Patent No.: US 12,744,374 B2
(45) Date of Patent: Sep. 22, 2026

(54) SYSTEMS AND METHODS FOR BREAKER OPERATION IN POWER SYSTEMS

(71) Applicant: Doosan Bobcat North America, Inc., West Fargo, ND (US)

(72) Inventors: Brandon Ahrens, Greensboro, NC (US); John Freeman, Charlotte, NC (US); Ctibor Baláš, Dobrís (CZ); Jaromir Nusl, Príbram (CZ)

(73) Assignee: Doosan Bobcat North America, Inc., West Fargo, ND (US)

(*) Notice: Subject to any disclaimer, the term of this patent is extended or adjusted under 35 U.S.C. 154(b) by 218 days.

(21) Appl. No.: 18/634,531

(22) Filed: Apr. 12, 2024

(65) Prior Publication Data

US 2024/0348042 A1 Oct. 17, 2024

Related U.S. Application Data

(60) Provisional application No. 63/496,134, filed on Apr. 14, 2023.

(51) Int. Cl.
*H01H 7/06* (2006.01)
*H02H 7/06* (2006.01)

(52) U.S. Cl.
CPC .................................. *H02H 7/065* (2013.01)

(58) Field of Classification Search
CPC ........... H02H 7/065; H02J 9/066; H02J 11/00
See application file for complete search history.

(56) References Cited

U.S. PATENT DOCUMENTS 4,953,052 A * 8/1990 Cartlidge .................. H02J 3/40 322/32
2016/0129862 A1 5/2016 Henrard et al.
2022/0320852 A1 * 10/2022 Maldonado ............. H02J 3/001

FOREIGN PATENT DOCUMENTS

EP 3337006 B1 4/2020
WO 9101582 A1 2/1991

OTHER PUBLICATIONS

International Searching Authority, International Search Report and Written Opinion for corresponding International Application No. PCT/US2024/024408, mailed Sep. 16, 2024 [8 pgs.].

* cited by examiner

*Primary Examiner* — Joseph Ortega
(74) *Attorney, Agent, or Firm* — Quarles & Brady LLP

(57) ABSTRACT

Systems and methods are provided for controlling breaker operation of power systems during a close before excitation (CBE) operation. One method includes closing the breaker of a generator prior to alternator voltage excitation, using power sourced from a permanent magnetic generator (PMG) that is coupled to the alternator.

16 Claims, 5 Drawing Sheets

SYSTEMS AND METHODS FOR BREAKER OPERATION IN POWER SYSTEMS

CROSS-REFERENCE TO RELATED APPLICATIONS

This application claims priority to U.S. Provisional Patent Application No. 63/496,134, filed Apr. 14, 2023, the entirety of which is incorporated herein by reference.

BACKGROUND

The present disclosure relates to power systems. More particularly, the disclosure relates to generators (including, e.g., portable power systems or generators) that are operatively configured to convert mechanical power (e.g., motive power or fuel-based power) into electric power, such as for powering an external circuit or load.

The discussion above is merely provided for general background information and is not intended to be used as an aid in determining the scope of the claimed subject matter.

SUMMARY

Configurations of the technology disclosed herein can relate generally to generators, and in particular to systems and methods for performing a close before excitation (CBE) operation with respect to a breaker of the power system. CBE generally refers to the closing of a main generator breaker before an AC alternator voltage is excited, such that the main generator breaker is closed before voltage excitation occurs at the alternator for delivery of electrical power to a load.

According to some aspects of the disclosure, a generator system may be provided. The generator system may include an alternator coupled to an engine and configured to provide a main voltage output to an external load. The generator system may include a permanent magnetic generator (PMG) coupled to the alternator. The generator system may include a breaker configured to open and close a connection with the external load. The generator system may include a breaker control relay coupled to the breaker to control operation of the breaker. The generator system may include a controller communicatively coupled to the breaker control relay, the controller configured to generate and transmit a control signal to the breaker control relay, where the control signal causes the breaker control relay to provide power from the PMG to close the breaker.

According to some aspects of the disclosure, a method for controlling a breaker of a generator may be provided. The method may include powering an alternator of the generator with an engine. The method may include, with the generator powered by the engine, closing the breaker of the generator using power sourced, via a breaker control relay coupled to the breaker, from a permanent magnetic generator (PMG) of the alternator of the generator. The method may include, after closing the breaker, causing voltage excitation at the alternator, to power an external load across the breaker.

According to some aspects of the disclosure, a generator system may be provided. The generator system may include an alternator coupled to an engine and configured to provide a main voltage output to an external load. The generator system may include a permanent magnetic generator (PMG) coupled to the alternator. The generator system may include a breaker configured to open and close a connection with the external load. The generator system may include a plurality of breaker control relays coupled to the breaker to control opening or closing of the connection between the breaker and the external load. The plurality of breaker control relays may include: a first breaker control relay configured to select a power source to source power to the breaker causing the breaker to close; and a second breaker control relay configured to provide power from the selected power source to the breaker causing the breaker to close. The generator system may include a controller communicatively coupled to the plurality of breaker control relays. The controller may be configured to generate and transmit a first control signal to the first breaker control relay, wherein, responsive to the first control signal, the first breaker control relay selects the PMG as the power source to source power to the breaker by coupling the PMG and the second breaker control relay. The controller may be configured to generate and transmit a second control signal to the second breaker control relay, wherein, responsive to the second control signal, the second breaker control relay provides power from the PMG to the breaker causing the breaker to close.

According to some aspects of the disclosure, a generator system may be provided. The generator system may include an alternator coupled to an engine and configured to provide a main voltage output to an external load. The generator system may include a breaker configured to open and close a connection with the external load. The generator system may include a breaker control relay coupled to the breaker to control operation of the breaker. The generator system may include a controller communicatively coupled to the breaker control relay. The controller may be configured to generate and transmit a control signal to the breaker control relay, where the control signal causes the breaker control relay to provide power to the breaker, from a power source selected from a plurality of power sources arranged to provide power to the breaker, to cause the breaker to open.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of non-limiting examples of the disclosure and are not intended to limit the scope of the disclosure or exclude alternative implementations.

DETAILED DESCRIPTION

Figure 1:
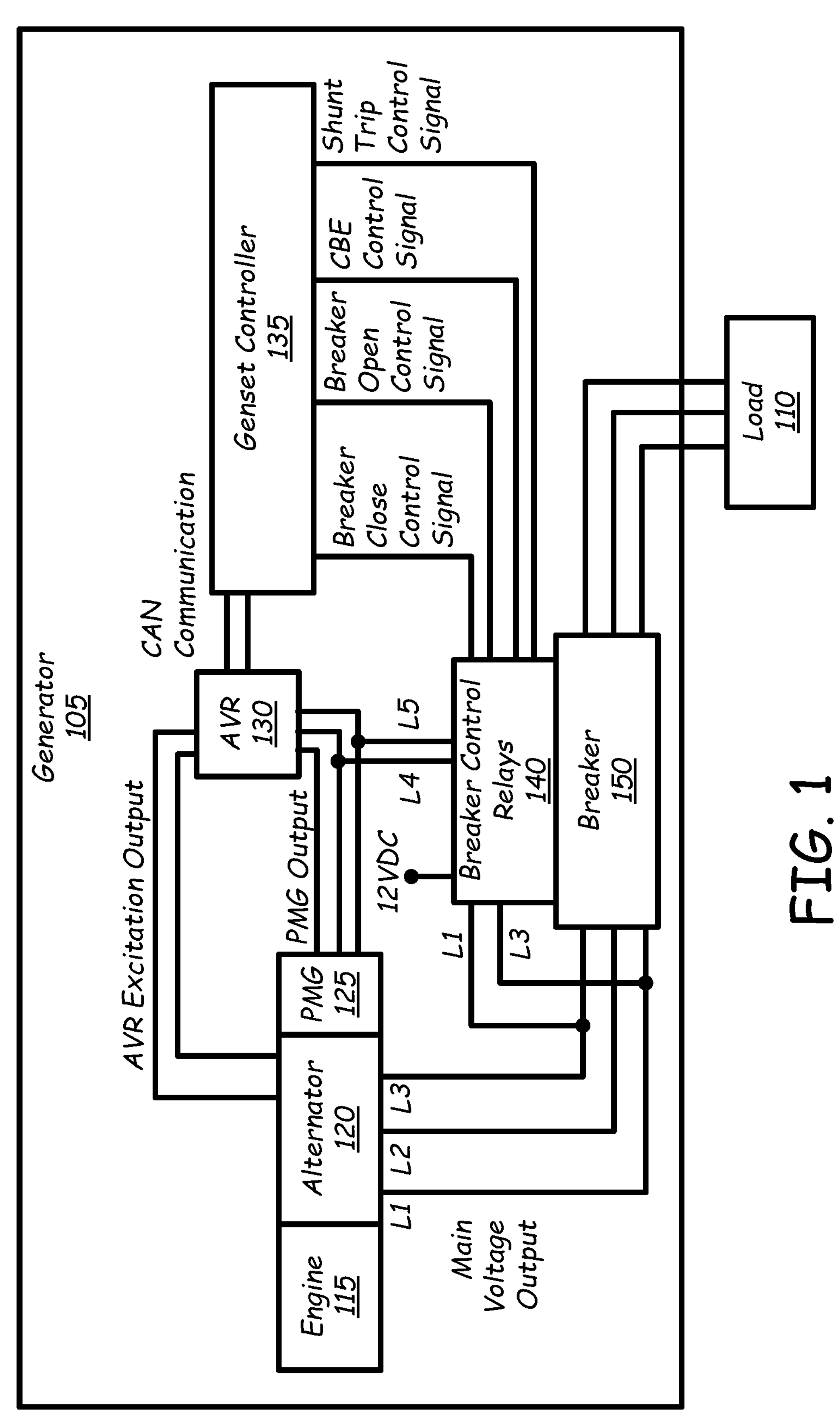
FIG. 1 is a schematic view of a power system according to some configurations.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

The technology disclosed herein provides systems and methods for performing a close before excitation ("CBE") operation with respect to a breaker of a power system. As also noted above, CBE refers to closing a main generator breaker before an AC alternator voltage is excited, such that a load can be exposed to the alternator voltage during voltage ramp-up.

As one example, a conventional generator startup operation sequence may include starting an engine of the generator, exciting the AC alternator voltage, and then closing a main generator breaker to power a load connected to the generator. In contrast, a CBE startup sequence may include starting an engine of the generator (or otherwise powering rotation of the alternator), closing the main generator breaker, and then exciting the AC alternator voltage to power a load connected to the generator.

Closing the breaker prior to excitation can provide various benefits. As one example, a CBE operation may be implemented as part of a soft start operation for a load. For instance, by closing the breaker before excitation, a voltage of a load (e.g., a motor) may be gradually ramped up such that the load effectively experiences a soft start. In contrast, without a CBE operation, the load may be exposed to an undesirably sharp change from zero to very high voltage when initially connected to the generator via the breaker. As another example, a CBE operation may enable quicker synchronization for multiple generator sets ("genset") arranged to provide power in parallel. For instance, the breaker of multiple (e.g., all) gensets may CBE to a common dead bus, and then automatic voltage regulators (AVRs) of the gensets can work together to bring up the bus voltage simultaneously. As noted above, this may generally allow faster synchronization overall than when the gensets synchronize individually to a live bus.

Many generator systems can include a 12 VDC control system, along with a 230 VAC motor module arranged to close the main generator breaker and to open the main generator breaker. Once an excitation voltage has been applied to an alternator, the 230 VAC to power the motor can be sourced from the alternator main voltage output. However, during CBE, in which the main generator breaker is closed prior to voltage excitation, the alternator main voltage output is not available to provide the 230 VAC signal.

To solve these and other challenges associated with performing a CBE operation for a generator (e.g., in 12 VDC systems), the technology disclosed herein may utilize a permanent magnetic generator (PMG) coupled to the alternator to power the closing of the main generator breaker before voltage excitation of the alternator. For example, some systems may include a PMG that is arranged to power the AVR. Because a PMG can provide voltage when a coupled alternator is spinning, and before excitation voltage is applied to the alternator, the PMG can provide a voltage signal to close a breaker during a CBE operation. For example, a PMG may provide voltage to power a 230 VAC motor module as discussed above.

FIG. 1 illustrates an example power system 100 according to some configurations. As illustrated, the power system 100 includes a generator set (or simply "generator") 105 arranged to power a load 110. The power system 100 may include additional, fewer, or different components than those illustrated in FIG. 1 in various configurations and may perform additional functionality than the functionality described herein. For example, in some configurations, the power system 100 may include multiple generators 105, may be configured to power multiple loads 110, or a combination thereof.

As illustrated in FIG. 1, the generator 105 may be connected to the load 110 such that the generator 105 may operatively convert mechanical power into electric power for powering the load 110. The load 110 may be, for example, a motor or any variety of other known external circuits. In the example of FIG. 1, the generator 105 also includes an engine 115, an alternator 120, a PMG 125, an AVR 130, a genset controller 135, a set of breaker control relays 140, and a breaker 150 (i.e., a main breaker for providing power to the load 110). In some configurations, the breaker 150 may be a motorized breaker. Alternatively, or in addition, in some configurations, the breaker 150 may be implemented in combination with a motor module. In other examples, other control systems are also possible, to generally implement control of the breaker 150 as discussed below.

During operation, the engine 115 may provide mechanical power to the alternator 120 and the alternator 120 may convert the mechanical power into electrical power (i.e., to provide a main voltage output) that may then be provided to the load 110. In the example illustrated in FIG. 1, the main voltage output of the alternator 120 may be a three-phase electric power output (represented in FIG. 1 by voltage output lines L1, L2, and L3). More specifically, the main voltage output may be provided to the load 110 via the breaker 150, with the breaker 150 being operable to disconnect the generator 105 from the load 110 when open. The breaker 150 may be controlled via the breaker control relays 140, as described in greater detail below.

As illustrated in FIG. 1, the alternator 120 may include or be otherwise coupled to the PMG 125, so that the PMG 125 can also receive mechanical power from the engine 115. Thus, during operation of the engine 115, the PMG 125 may provide operational power to the AVR 130. As also illustrated in FIG. 1, the PMG 125 may be connected to the breaker control relays 140 via one or more lines (e.g., represented in FIG. 1 as line L4 and line L5), as described in greater detail below. The AVR 130 may provide excitation output signals to the alternator 120 according to various known approaches, to control the main output voltage of the alternator 120 via control of AVR excitation output signals provided to an excitation winding in the alternator 120. Under various known approaches, the AVR 130 and the alternator 120 may provide a closed loop system in which the AVR 130 may sense the output voltage of the alternator 120 and the AVR 130 may increase or decrease excitation voltage sent to the alternator 120 to maintain a target output voltage from the alternator 120. The AVR 130 may also communicate with the genset controller 135, e.g., via CAN communication lines. Thus, for example, the AVR 130 may provide an indication of the sensed output voltage of the alternator 120 to the genset controller 135 or may receive control signals for voltage excitation from the genset controller 135 (via, e.g., the CAN communication lines).

The genset controller 135 may generate one or more control signals, including for controlling the breaker control relays 140 (e.g., to cause one or more of the breaker control relays 140 to change state responsive to a relevant control signal). For instance, as illustrated in FIG. 1, the genset controller 135 may be configured to generate (and transmit) a breaker close control signal, a breaker open control signal, a CBE control signal, or a shunt trip control signal to corresponding components of the breaker control relays 140. In general, a control signal, when received by a respective breaker control relay, may energize the respective breaker control relay, which, ultimately, may result in the respective breaker control relay switching between switching positions (e.g., an open position or a close position). In some configurations, the control signals may be utilized to open or close the breaker 150 (e.g., the breaker open control signal, the breaker close control signal, or the shunt control signal), as described in greater detail herein. Alternatively, or in addition, in some configurations, the control signals may be utilized to select a power source for controlling the breaker 150, such as, e.g., a power source utilized for closing the breaker 150 (e.g., the CBE control signal). For example, the breaker close control signal may energize a breaker close relay, which may cause the breaker 150 to close. The breaker open control signal may energize a breaker open relay, which may cause the breaker 150 to open. The shunt trip control signal may control (or energize) a shunt trip relay to "trip" or open the breaker 150, including as described in greater detail below.

Alternatively, or in addition, in some configurations, the control signals may be utilized to select a power source for controlling the breaker 150, such as, e.g., a power source utilized for closing the breaker 150 (e.g., the CBE control signal). The CBE control signal may control (or energize) a CBE relay to control which power source is utilized for controlling the breaker 150 (e.g., utilized to close the breaker 150). As described in greater detail herein, the selection of which power source is utilized for controlling the breaker 150 (e.g., closing the breaker 150) may be based on whether the CBE relay is in an energized state or a de-energized state, as described in greater detail herein.

The genset controller 135 may be configured as a controller of various known types of controllers for generators and may thus generally include an electronic processor (for example, a microprocessor, an application-specific integrated circuit ("ASIC"), or another suitable electronic device), a memory (for example, a non-transitory, computer-readable medium), and a communication interface (not shown in FIG. 1) that can communicate over one or more communication lines or buses. The genset controller 135 may include additional components in various configurations and may perform additional functionality than the functionality described herein. Further, in some configurations, the functionality described herein as being performed by the genset controller 135 may be distributed among other components or devices (e.g., the genset controller 135 may be implemented as multiple separate devices). As generally understood in the art, the electronic processor can be configured to access and execute computer-readable instructions ("software") stored in the memory, including firmware, one or more applications, program data, filters, rules, one or more program modules, and other executable instructions. For example, the software may include instructions and associated data for performing a set of functions, including the methods or functionality described herein. In some configurations, the memory may store control logic for controlling one or more components of the generator 105, such as, e.g., one or more of the breaker control relays 140 via one or more control signals (as described in greater detail herein).

Figure 2:
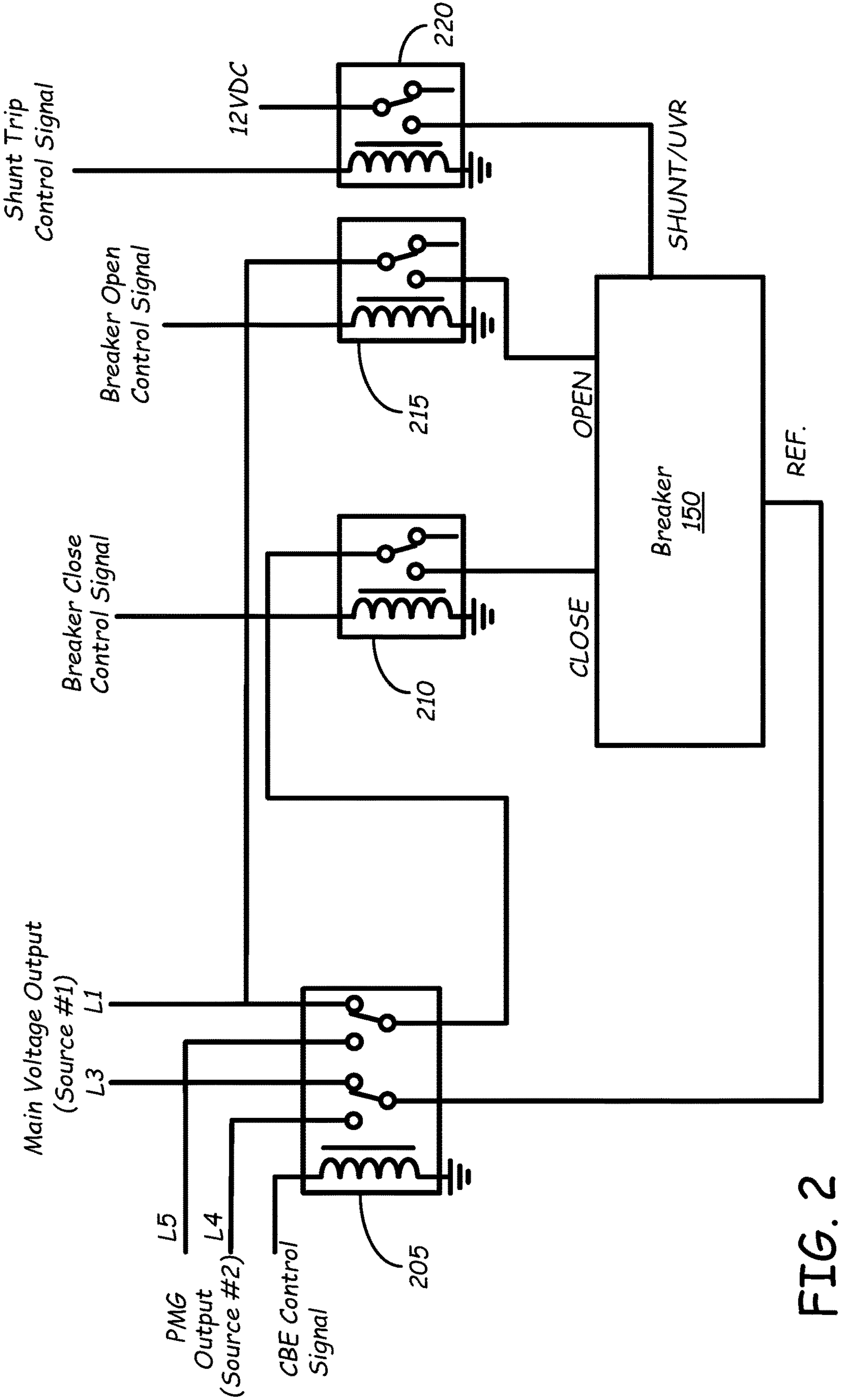
FIG. 2 schematically illustrates an example configuration of breaker control relays for the power system of FIG. 1.

FIG. 2 illustrates an example configuration of the breaker control relays 140. As illustrated in FIG. 2, the breaker control relays 140 may include a CBE relay 205, a breaker close relay 210, a breaker open relay 215, and a shunt trip or under voltage release ("UVR") relay 220. As used herein, a relay generally refers to an electrically operated switch. While the technology disclosed herein may be implemented with any type or arrangement of relays, the technology disclosed herein is generally described with respect to relays that change a switching position while a control or activation signal is present (generally referred to as non-latching relays). However, the technology disclosed herein may be implemented with a relay that maintains its last condition or position even after the control or activation signal is no longer present, such as, e.g., a latching relay, a bistable relay, a persistent state relay, etc. (generally referred to herein as a latching relay). In configurations in which one or more latching relays are implemented, multiple control signals may be utilized to control a switching position of the respective latching relay(s), such as, e.g., a first control signal for a first switching position and a second control signal for a second switching position.

The CBE relay 205 may control selection of a voltage source (also referred to herein as a power source) for opening or closing the breaker 150. For example, the CBE relay 205 may control whether the main voltage output is used as a power source for the breaker 150 or whether the PMG output is used as a power source for the breaker 150. The selection of which power source is utilized for controlling the breaker 150 (e.g., closing the breaker 150) may be based on whether the CBE relay 205 is in an energized state or a de-energized state. In some configurations, when the CBE relay 205 is de-energized, the main voltage output may be used as the power source (e.g., as a first power source). When the CBE relay 205 is energized, the PMG output may be used as the power source (e.g., as a second power source). A state (e.g., the energized state or the de-energized state) of the CBE relay 205 may be based on control signals from the genset controller 135 (e.g., the CBE control signal(s)). For instance, in some configurations in which the CBE relay 205 is a non-latching relay, the CBE relay 205 may be energized (e.g., in an energized state) responsive to receipt of a CBE control signal from the genset controller 135, and the CBE relay 205 may be de-energized (e.g., in a de-energized state) when a CBE control signal is not received from the genset controller 135 (e.g., when the CBE control signal is not present).

The breaker close relay 210 may control the closing of the breaker 150 by providing power from the selected power source, in response to corresponding control signals from the genset controller 135. For example, as illustrated in FIG. 2, when the breaker close relay 210 is energized, power (e.g., AC voltage) from the selected power source (via, e.g., the CBE relay 205) is applied to the breaker 150 to close the breaker 150. As illustrated in FIGS. 1 and 2, the breaker close relay 210 may receive a breaker close control signal, corresponding to the breaker close output of FIG. 1, from the genset controller 135. Accordingly, as further discussed below, control signals from the genset controller 135 to the CBE relay 205 and the breaker close relay 210 can be used to controllably apply power from a selected power source to close the breaker 150.

In contrast, the breaker open relay 215 may control the opening of the breaker 150. For example, as illustrated in FIG. 2, when the breaker open relay 215 is energized, power (e.g., AC voltage) from the main voltage output of the alternator 120 is applied to the breaker 150 to open the breaker 150. As illustrated in FIGS. 1 and 2, the breaker open relay 215 may receive a breaker open control signal, corresponding to the breaker open output of FIG. 1, from the genset controller 135.

The shunt trip relay 220 may control the breaker 150 to open or trip, (e.g., by tripping the breaker 150 according to generally known approaches). For example, as illustrated in FIG. 2, when the shunt trip relay 220 is energized, power (e.g., DC voltage) from an auxiliary power source is applied to the breaker 150 to trip the breaker 150 to an open configuration. In some cases, as illustrated in FIG. 2, the shunt trip relay 220 may be connected to a 12 VDC power source (as an auxiliary power source). As illustrated in FIGS. 1 and 2, the shunt trip relay 220 may receive a shunt trip control signal, corresponding to the shunt trip output of FIG. 1, from the genset controller 135. In some configurations, an undervoltage release (UVR) may be used in place of a shunt trip. An UVR has the inverse logic to a shunt trip. A shunt trip is energized to trip the breaker 150 and de-energized to not trip the breaker 150 while the UVR is de-energized to trip the breaker 150 and energized to not trip the breaker 150.

Figure 3:
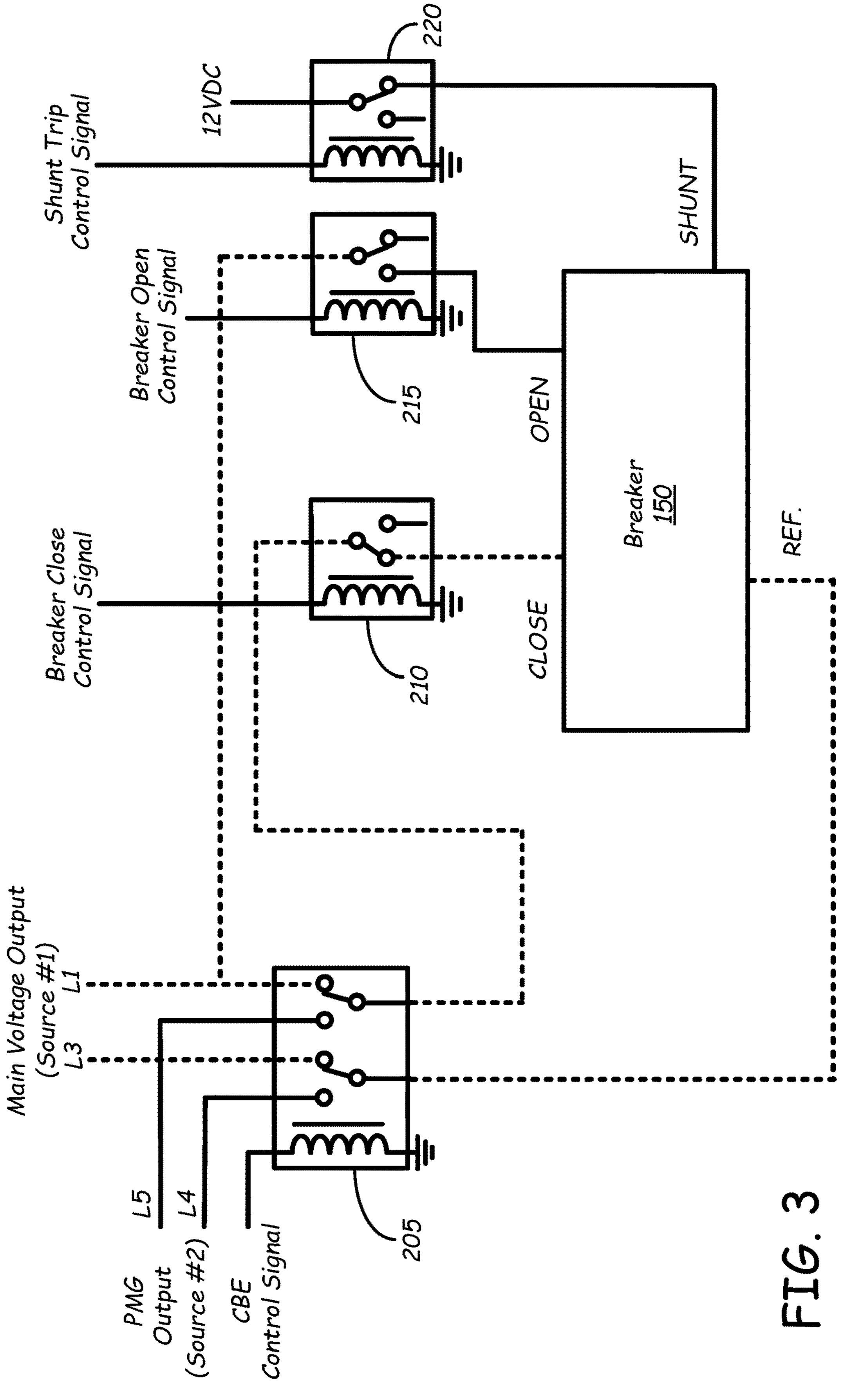
FIG. 3 schematically illustrates an example operation of the breaker control relays of FIG. 2 to open a breaker with a first power source.
Figure 4:
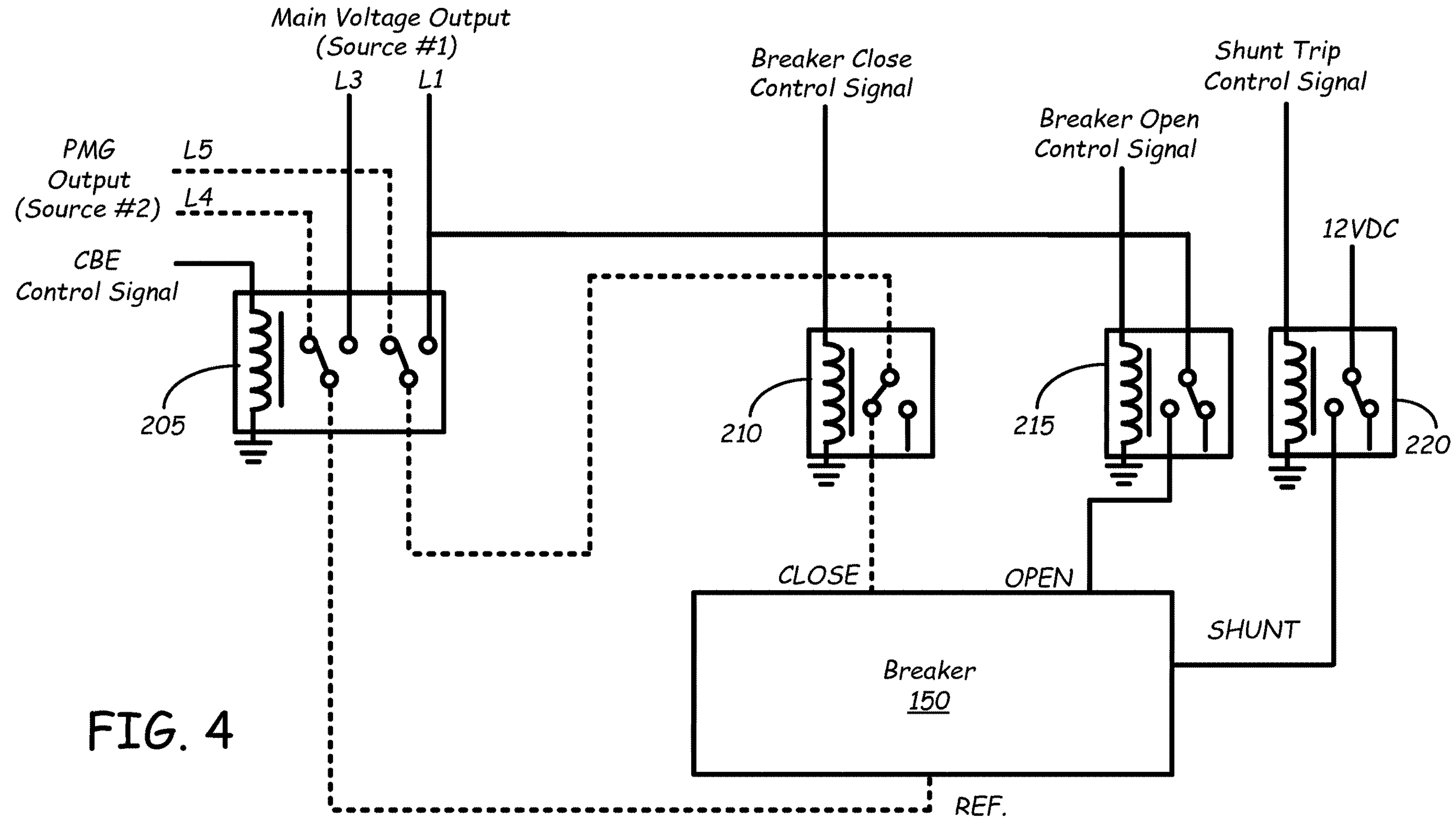
FIG. 4 schematically illustrates an example operation of the breaker control relays of FIG. 2 to open the breaker with a second power source.

FIG. 3 illustrates an example state of the breaker control relays 140 when the CBE relay 205 is de-energized, which may result in the main voltage output being utilized to close the breaker 150. The main voltage output is represented as dashed lines in FIG. 3. FIG. 4 illustrates an example state of the breaker control relays 140 when the CBE relay 205 is energized, which may result in the PMG output being utilized to close the breaker 150. The PMG output is represented as dashed lines in FIG. 4. As noted above, the CBE relay 205 may control selection of a voltage source for opening or closing the breaker 150. Thus, depending on the state of the CBE relay 205, different power sources can be used to close the breaker 150 when the breaker close relay 210 is energized.

In some configurations, after the breaker 150 has been closed and the alternator 120 has been excited, the breaker open relay 215 or the shunt trip relay 220 can then be selectively used to re-open the breaker 150 as needed. For example, as also generally described herein, the genset controller 135 can energize the breaker open relay 215 to open the breaker 150, such as, e.g., when power (e.g., the main voltage output) is available from the alternator 120 (see FIG. 1). Alternatively, or in addition, the genset controller 135 can energize the shunt trip relay 220 when power (e.g., the main voltage output) is not available from the alternator 120.

Figure 5:
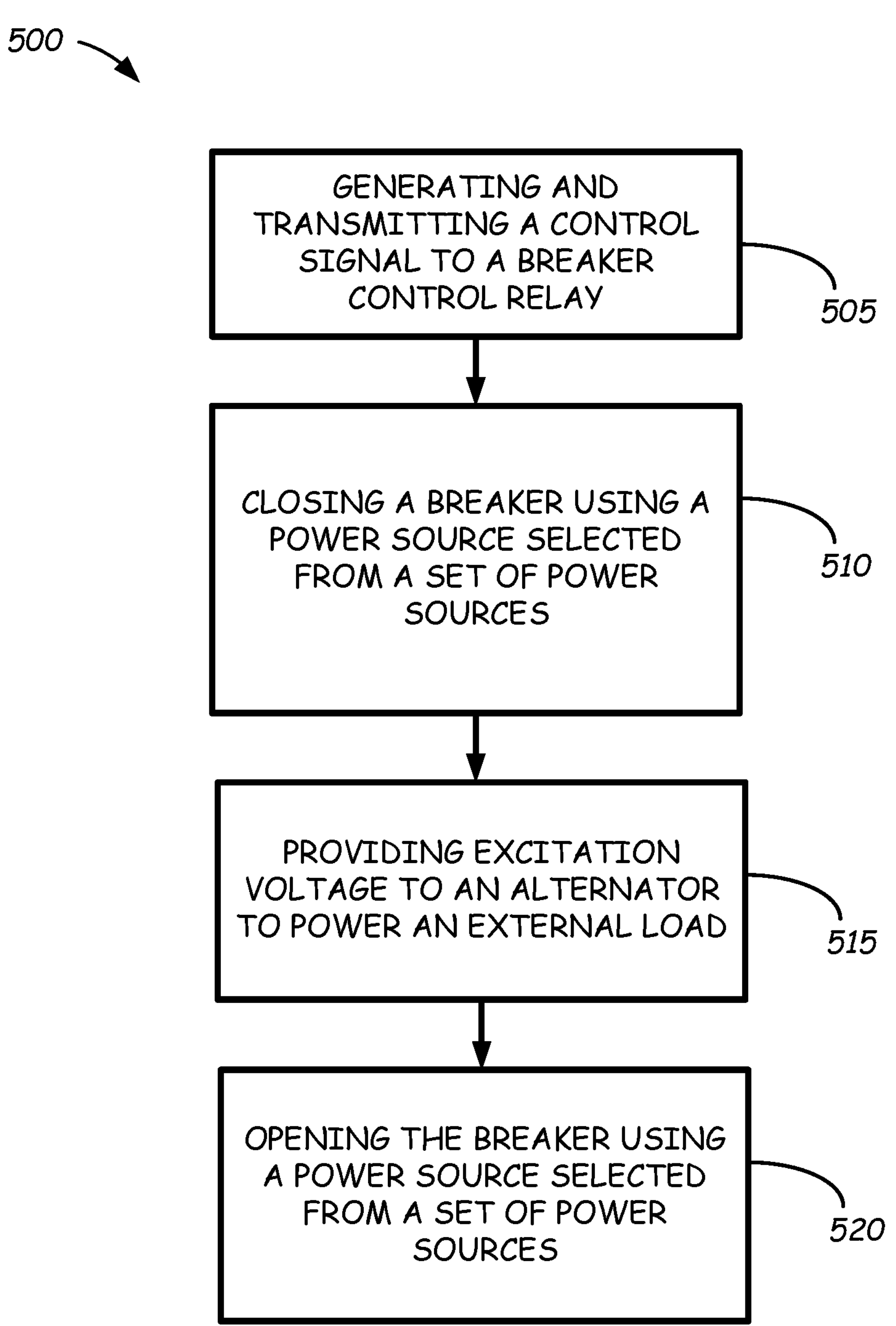
FIG. 5 is a flowchart of a method of controlling breaker operation for generators according to some configurations.

FIG. 5 illustrates an example method 500 of controlling breaker operation for generators according to some configurations. In some examples, the method 500 can be performed by the genset controller 135 for the power system 100. However, in some configurations, the method 500 may be performed by another device or devices or for other power systems.

As illustrated in FIG. 5, the method 500 may include generating control signals and transmitting the control signals to one or more of the breaker control relays 140 (e.g., as illustrated in FIG. 2), with the control signals corresponding to selection of particular power sources (at block 505). Thus, for example, a first control signal can correspond to selection of a first power source to operate a breaker, a second control signal can correspond to a selection of a second power source to operate the breaker, and so on. In response to particular control signals, the breaker 150 for the generator 105 can thus be closed using power from a selected power source (at block 510). For example, as discussed above, the breaker 150 can be selectively closed using power from a main voltage output of the alternator 120 or from the PMG 125, with power from the PMG 125 in particular allowing CBE operation.

Continuing with respect to FIG. 5, once the breaker 150 has been closed, the alternator 120 connected to the breaker 150 can be excited as needed (at block 515), so that power from the main voltage output of the alternator 120 can be provided to an external load (e.g., the load 110 of FIG. 1) via the breaker 150. Further, the breaker 150 can then be reopened as desired, including by selectively using power from the main voltage output of the alternator 120, an auxiliary power source, or other set of power sources (at block 520). Thus, in some configurations, the method 500 may include controlling the opening of the breaker 150 in response to first selecting a power source for opening the breaker 150 (e.g., the main voltage output or power from an auxiliary power source).

Correspondingly, the genset controller 135 may in some cases determine whether the main voltage output is available (e.g., based on communication with the AVR 130 or direct monitoring of the main voltage output of the alternator 120) and then select a power source accordingly to open of the breaker 150. For example, when the genset controller 135 determines that the main voltage output is unavailable, the genset controller 135 may generate and transmit a control signal (e.g., a shunt trip control signal) for energizing the shunt trip relay 220 such that power from an auxiliary source (e.g., 12 VDC, as illustrated in FIGS. 2-4) is utilized to open the breaker 150. When the genset controller 135 determines that the main voltage output is available, the genset controller 135 may generate and transmit a control signal (e.g., a breaker open control signal) for energizing the breaker open relay 215 such that the main voltage output of the alternator 120 is utilized to open the breaker 150. Accordingly, in some cases, the genset controller 135 may default to the use of a main voltage output, when available, to open (or close) the breaker 150.

Accordingly, the technology disclosed herein may provide methods and systems for controlling a generator, and, in some instances, for controlling a CBE operation for the breaker 150 of the generator 105. For instance, control of a CBE operation for the breaker 150 of the generator 105 may include the generation and transmission, with the genset controller 135, of one or more control signals to the breaker control relays 140 (e.g., a first control signal to a first breaker control relay, a second control signal to a second breaker control relay, etc.). In some examples, the genset controller 135 may generate and transmit the CBE control signal (e.g., as a first control signal) to the CBE relay 205 (e.g., as a first breaker control relay). Responsive to the CBE control signal, the CBE relay 205 may select a power source for sourcing power to the breaker 150. As described in greater detail herein, in some configurations, the CBE relay 205 may select, responsive to the CBE control signal, the PMG output or the main voltage output as the power source for sourcing power to the breaker 150, and, ultimately, causing the breaker 150 to close. The genset controller 135 may generate and transmit the breaker close control signal (e.g., as a second control signal) to the breaker close relay 210 (e.g., as a second breaker control relay). Responsive to the breaker close control signal, the breaker close relay 210 may provide power sourced from the selected power source (e.g., the PMG output or the main voltage output) to the breaker 150, causing the breaker 150 to close.

After the breaker 150 is closed, a voltage excitation may be caused at the alternator 120. After causing the voltage excitation at the alternator 120, the genset controller 135 may generate and transmit the breaker open control signal (e.g., as a third control signal) to the breaker open relay 215 (e.g., as a third breaker control relay). Responsive to the breaker open control signal, the breaker open relay 215 may provide the main voltage output of the alternator 120 to the breaker 150, causing the breaker 150 to open. Alternatively, in some instances, such as when the main voltage output of the alternator 120 is unavailable, the genset controller 135 may generate and transmit the shunt trip control signal (as a fourth control signal) to the shunt trip relay 220. Responsive to the shunt trip control signal, the shunt trip relay 220 may provide auxiliary power (e.g., power from an auxiliary power source) to the breaker 150, causing the breaker 150 to open or "trip."

In some embodiments, aspects of the disclosed technology, including computerized implementations of methods according to the disclosed technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosed technology can be implemented as a set of instructions, tangibly embodied on a non-transitory computer-readable media, such that a processor device can implement the instructions based upon reading the instructions from the computer-readable media. Some embodiments of the disclosed technology can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosed technology, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the disclosed technology. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise expressly limited or defined, the term "automatic" refers to operations (or systems, etc.) that are at least partly dependent on electronic application of computer algorithms for decision-making without human intervention. Thus, for example, automatic operation of a generator system can be controlled by a real-time combination of computer and human decision making or by independent computer-implemented control.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as "either," "one of," "only one of," or "exactly one of."

Unless otherwise specifically indicated, ordinal numbers are used herein for convenience of reference, based generally on the order in which particular components are presented in the relevant part of the disclosure. In this regard, for example, designations such as "first," "second," etc., generally indicate only the order in which a thus-labeled component is introduced for discussion and generally do not indicate or require a particular spatial, functional, temporal, or structural primacy or order.

Although the present disclosure has been described by referring to preferred embodiments, workers skilled in the art will recognize that changes may be made in form and detail without departing from the scope of the discussion.

What is claimed is:

1. A generator system comprising:
- an alternator coupled to an engine and configured to provide a main voltage output to an external load;
- a permanent magnetic generator (PMG) coupled to the alternator;
- a breaker configured to open and close a connection with the external load;
- a first breaker control relay coupled to the breaker to control operation of the breaker;
- a second breaker control relay coupled to the breaker to control operation of the breaker; and
- a controller communicatively coupled to the first breaker control relay, the controller configured to:
  - generate and transmit a first control signal to the first breaker control relay, wherein the first control signal causes the first breaker control relay to provide power from the PMG to close the breaker; and
  - generate and transmit a second control signal to the second breaker control rely, wherein the second control signal causes the second breaker control relay to provide power from the main voltage output from the alternator to the breaker to cause the breaker to open.

2. The generator system of claim 1, wherein the controller is configured to transmit the first control signal in response to determining that the main voltage output from the alternator is unavailable.

3. The generator system of claim 1, wherein the first breaker control relay is configured to, responsive to the first control signal causing a first state of the first breaker control relay, select the PMG as a power source from a set of power sources to close the breaker, the set of power sources including the PMG and the main voltage output.

4. The generator system of claim 3, wherein, when the first breaker control relay is in a second state different from the first state, the main voltage output from the alternator is selected as the power source from the set of power sources to close the breaker.

5. The generator system of claim 1, comprising:
- a third breaker control relay coupled to the breaker, the third breaker control relay configured to:
  - receive a third control signal from the controller; and
  - responsive to the third control signal, provide the power from the PMG to the breaker to cause the breaker to close.

6. The generator system of claim 1, wherein the breaker is a 230 VAC motorized breaker.

7. The generator system of claim 1, comprising:
- a fifth breaker control relay coupled to the breaker, the fifth breaker control relay configured to:
  - receive a fifth control signal from the controller; and
  - responsive to the fifth control signal, provide auxiliary power from an auxiliary power source to the breaker to cause the breaker to open.

8. The generator system of claim 7, wherein the controller is configured to generate and transmit the fifth control signal when the main voltage output of the alternator is unavailable.

9. The generator system of claim 7, wherein the auxiliary power source is a 12 VDC power supply.

10. The generator system of claim 1, wherein, after the breaker is closed, the alternator is configured to receive an excitation voltage such that power is provided to the external load.

11. The generator system of claim 10, comprising:
- a sixth breaker control relay coupled to the breaker, the sixth breaker control relay configured to:
- after the alternator receives the excitation voltage, receive a sixth control signal from the controller; and
- responsive to the sixth control signal, provide power to the breaker to open the breaker.

12. A method for controlling a breaker of a generator, the method comprising:
- powering an alternator of the generator with an engine;
- with the generator powered by the engine, closing the breaker of the generator using power sourced, via a first breaker control relay coupled to the breaker and configured to provide power to the breaker, from a permanent magnetic generator (PMG) of the alternator, wherein a controller of the generator is configured to generate and transmit a first control signal to the first breaker control relay, wherein, responsive to receipt of the first control signal, the first breaker control relay provides the power from the PMG to the breaker to cause the breaker to close; and
- after closing the breaker, causing voltage excitation at the alternator, to power an external load across the breaker.

13. The method of claim 12, further comprising:
- after causing voltage excitation at the alternator, opening the breaker using power from a main voltage output of the alternator.

14. The method of claim 12, further comprising:
- after closing the breaker, opening the breaker using power from an auxiliary DC power supply.

15. The method of claim 12, wherein closing the breaker of the generator includes:
- generating and transmitting, with the controller of the generator, a second control signal to a second breaker control relay, the second breaker control relay configured to select the PMG as a power source from a set of power sources to source power to close the breaker,
- wherein, responsive to receipt of the second control signal, the second breaker control relay couples the PMG and the breaker such that the power sourced from the PMG is provided to the breaker to cause the breaker to close.

16. A generator system comprising:
- an alternator coupled to an engine and configured to provide a main voltage output to an external load;
- a permanent magnetic generator (PMG) coupled to the alternator;
- a breaker configured to open and close a connection with the external load;
- a first breaker control relay coupled to the breaker to control operation of the breaker;
- a second breaker control relay coupled to the breaker to control operation of the breaker; and
- a controller communicatively coupled to the breaker control relay, the controller configured to generate and transmit a first control signal to the first breaker control relay, wherein the first control signal causes the first breaker control relay to provide power from the PMG to close the breaker;

wherein, after the breaker is closed, the alternator is configured to receive an excitation voltage such that power is provided to the external load; and wherein, after the alternator receives the excitation voltage, the controller is configured to generate and transmit a second control signal to the second breaker control relay, and wherein, responsive to the second control signal the second breaker control relay provides power to the breaker to open the breaker.

* * * * *